F. SAMUELSON.
EMERGENCY GOVERNOR.
APPLICATION FILED OCT. 16, 1909.

960,411. Patented June 7, 1910.

Witnesses:

Inventor,
Frederick Samuelson,
by Abbott, Davis
Att'y.

UNITED STATES PATENT OFFICE.

FREDERICK SAMUELSON, OF RUGBY, ENGLAND, ASSIGNOR TO GENERAL ELECTRIC COMPANY, A CORPORATION OF NEW YORK.

EMERGENCY-GOVERNOR.

960,411.  Specification of Letters Patent.  Patented June 7, 1910.

Application filed October 16, 1909. Serial No. 523,006.

*To all whom it may concern:*

Be it known that I, FREDERICK SAMUELSON, a subject of the King of Sweden, residing at Rugby, England, have invented certain new and useful Improvements in Emergency-Governors, of which the following is a specification.

This invention relates to emergency governing devices for steam engines, turbines and other machines, which devices act automatically to interrupt the supply of steam or other motive energy when the speed of the apparatus exceeds a safe limit, thereby safeguarding said apparatus against damage or possible destruction and also protecting adjacent objects from injury by flying masses thrown off by centrifugal action should the uncontrolled speed become so great as to burst the rotating members.

The object of the invention is to provide an improved emergency governing device of relatively simple and inexpensive construction which is efficient and certain in operation.

Figure 1:
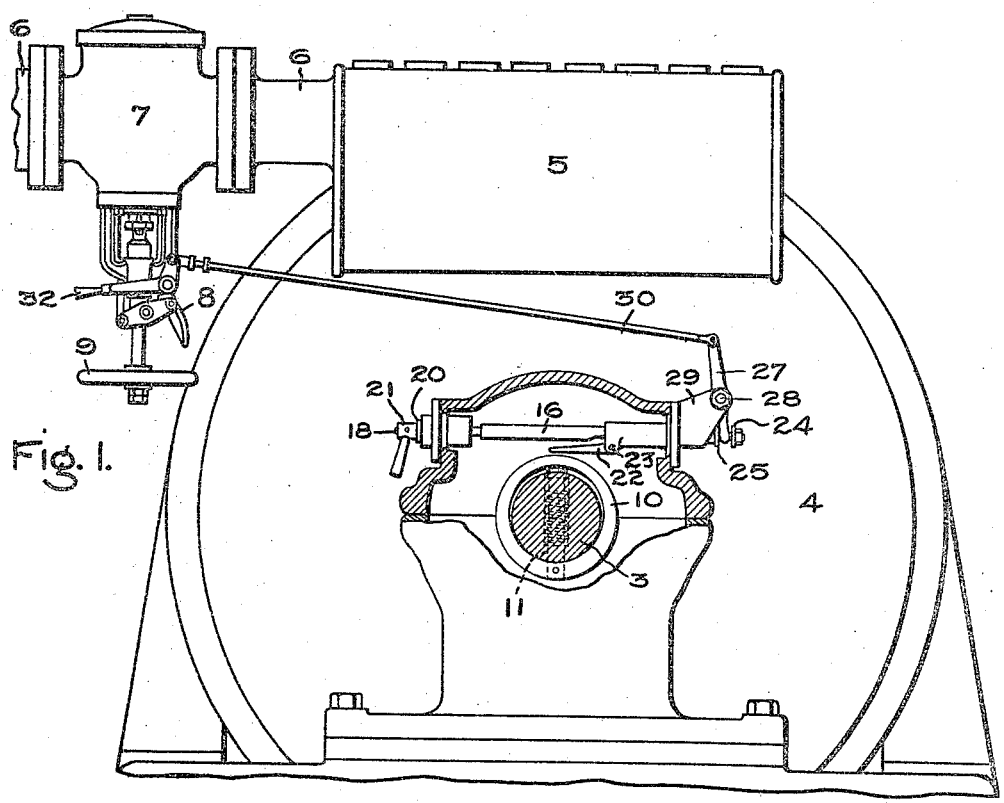
Figure 2:
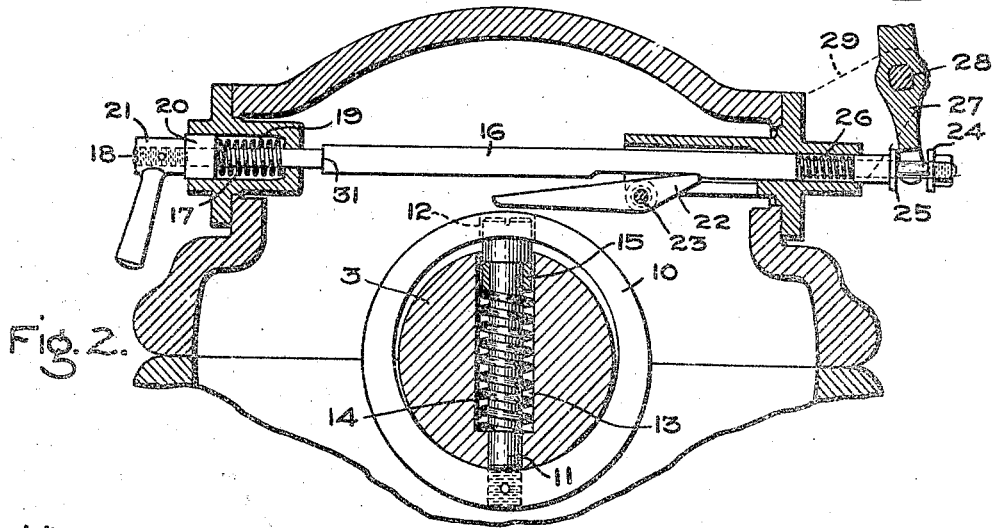

In the accompanying drawing illustrating an embodiment of the invention, Figure 1 is an end view with parts in section showing the emergency-governing mechanism as applied to a steam turbine; and Fig. 2 is an enlarged detail sectional view of the governing mechanism and the adjacent portion of the turbine.

While the invention is illustrated as applied to a horizontal turbine it can also be used on a vertical shaft turbine, or on a reciprocating engine. In the horizontal turbine shown in the drawing, the rotor is mounted upon a shaft 3 and inclosed in a casing 4. Motive fluid, such as steam, is conveyed to the steam-chest 5 by a pipe or conduit 6 leading from any suitable source of supply. The flow through conduit 6 is controlled by the combined emergency and stop valve 7. The valve 7 illustrated is of the sliding-nut type but any other approved design of emergency and stop valve can be used or the two functions of the valve 7 can be performed by separate valves, if desired. The nut of the valve 7 is normally held in fixed position by a lock or latch 8 and when the nut is so held the valve can be manually opened or closed by means of the wheel 9.

On some convenient portion of the shaft 3 or of some other shaft driven therefrom, an eccentric ring 10 is mounted, that is, a ring whose mass is unequally distributed about the axis of the shaft. Under normal conditions the periphery of the ring is concentric with the shaft 3, Figs. 1 and 2, while its bore is eccentric to the shaft. A pin or bolt 11 mounted for sliding movement in the shaft has its end secured in the thicker or heavier portion of the ring 10. The head of the bolt 11 enters an opening 12 in the opposite portion of the ring but lies within the periphery of the ring when the parts are assembled. The opening 12 makes it possible to insert the bolt in the bore in the shaft and to screw its end into the ring when the governor is being assembled and also permits the removal of the bolt when desired. The bore or hole in which the bolt 11 is mounted is chambered out at 13 to receive a spring 14 that surrounds a portion of the body of the bolt and extends between the bottom of the chamber and a sleeve or washer 15 that engages the head of said bolt. The member 15 can be omitted under some conditions and the spring will then engage the head directly. The spring 14 tends to hold the ring in the position shown, Fig. 2, with the thicker portion of the ring in contact with the shaft. The force exerted by the spring to hold the ring in said position can be adjusted by varying the width of the sleeve 15 or the length of the head of the bolt thereby placing the spring under greater or less initial tension. By arranging the spring close to the axis of rotation, the effect of centrifugal action on its mass is minimized. The bolt and its associated parts can be so made and arranged as to have their masses balanced with respect to the axis of rotation by suitably proportioning said masses and disposing them with respect to said axis.

A rod or shaft 16 is slidingly mounted in the frame or casing of the turbine adjacent the ring 10 with its axis at right angles to the axis of the shaft 3. A spring 17, surrounding the end portion 18 of the rod 16 and extending between the bottom of the inclosing chamber 19 and the sleeve or washer 20 on said rod, tends to move the rod toward the left, Fig. 2. A nut 21 holds the parts 17 and 20 in position and affords a means for adjusting the tension of the spring 17 when desired. A latch or trigger 22 pivoted at 23 holds the rod 16 against movement by the spring 17. One end of the trigger extends over the center of the shaft 3 into rather close proximity to the periphery of the ring 10, while its other end engages a suitable notch in the rod 16. The weight of the heavier left end of the trigger tends to cause the other end of the trigger to engage said notch. A suitable spring can be used to swing the trigger into engagement with the notch when the shaft 3 is arranged vertically, or to assist the weight of the left end of the latch in causing said engagement when the shaft is horizontal. The right end of the rod 16 is provided with a fixed abutment formed by washer 24 secured on said rod and a yielding spring-pressed abutment formed by a sleeve 25 slidingly mounted on the rod and pressed outward by a spring 26. An arm or lever 27 pivoted at 28 in the bracket 29 has a forked end that receives the rod 16 and engages said abutments. The other end of the lever is connected by a rod or link 30 with the latch 8 of the valve 7.

If the speed of rotation of the shaft 3 increases beyond the predetermined safe limit, the action of centrifugal force on the eccentric ring 10 overcomes the force of the spring 14 tending to hold the ring in the position shown in Fig. 2. The ring and the bolt 11 then move transversely of the shaft causing the ring to strike the adjacent end of the trigger 22 and release the rod 16 to the action of the spring 17 which moves said rod toward the left, Fig. 2. The shoulder 31 limits the movement of the rod in that direction. The movement of the rod 16 is communicated through the lever 27 and the link 30 to the latch 8 to trip the valve 7 and thereby quickly shut down the turbine. When the trigger 22 has been moved from the notch in the rod 16, the portion of the rod to the right of the notch holds the left end of the trigger out of the path of the ring 10 and prevents the ring from hammering said end as the shaft slows down to a speed such that the spring 14 is able to overcome the action of centrifugal force and restore the ring to the position shown in Fig. 2. The parts may be reset by moving the rod 16 to the right when the weight of the heavier left end of the trigger will cause its other end to engage the notch in said rod and hold it against the action of the spring 17. The handle or lever 32 adjacent the hand wheel 9 may be used to reset the parts as above described and in coöperation with the wheel 9 to reset the nut and latch of the valve 7.

The sliding abutment 25 permits the attendant to manually trip the valve 7, by means of the lever 27, rod 30 or the handle 32 when desired without disturbing the setting of rod 16 and the trigger 22.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a prime mover, a shaft driven thereby, a ring surrounding said shaft and having its mass unequally distributed about the axis of said shaft, a pin or bolt transversely mounted in the shaft for sliding movement therein, said bolt being connected to the ring, a device which opposes the sliding movement of the bolt, and means for regulating the supply of motive energy to the prime mover that is actuated by the movement of the ring when the speed of rotation exceeds a certain limit.

2. In a governing mechanism, the combination of a rotating shaft, an eccentric ring surrounding the shaft, a pin or bolt mounted diametrically of the shaft for sliding movement therein, one end of the bolt being connected to the ring, a spring which opposes the sliding movement of the bolt, and regulating mechanism that is operated by the ring when the speed of the shaft exceeds a predetermined limit.

3. In a governing mechanism, the combination of a rotating shaft having a diametrically arranged bore therethrough provided with a chambered portion, an eccentric ring surrounding the shaft, a headed bolt mounted for sliding movement in the bore with its end projecting from said bore, said end being attached to the thicker portion of the ring, a spring arranged in said chambered portion that surrounds the body of the bolt and extends between the bottom of the chamber and the head of the bolt, and a regulating mechanism that is actuated by the ring when the speed of rotation of the shaft exceeds a predetermined limit.

4. In combination, a rotating shaft having a diametrically arranged bore therethrough, said bore having a portion of a given diameter at one side of the shaft and a portion of larger diameter extending therefrom to the opposite side of the shaft, a ring surrounding the shaft and having its mass unequally distributed about the axis of said shaft, a bolt mounted for sliding movement in the first portion of the bore and having its end projecting therefrom into engagement with the heavier portion of the ring, a spring in the larger portion of the bore that is arranged around the body of the bolt between the bottom of said portion and the head of said bolt, and regulating mechanism that is actuated by the ring when the speed of rotation of the shaft exceeds a predetermined limit.

5. In a governing mechanism, the combination of a rotating shaft having a diametrically arranged bore therethrough, said bore having a portion of a given diameter at one side of the shaft and a portion of larger diameter extending therefrom to the opposite side of the shaft, an eccentric ring surrounding the shaft, a bolt mounted for sliding movement in the first portion of the bore and having its end projecting therefrom into threaded engagement with the thicker portion of the ring, a spring arranged around the body of the bolt in the larger portion of the bore with one end in engagement with the shaft at the bottom of said portion, a sleeve or washer on the bolt between the other end of the spring and the head of the bolt, there being an opening in the thinner portion of the ring through which the bolt may be inserted in the bore, and regulating mechanism that is operated by the ring when the speed of rotation of the shaft exceeds a predetermined limit.

6. In a governing mechanism, the combination of a rotating shaft, an eccentric ring surrounding the shaft, a bolt having a head at one end and a screw-threaded portion at its other end, said ring being provided with a threaded opening in its thicker portion to receive the threaded end of said bolt and an oppositely located opening through which the bolt may be passed to screw said end into the ring, the head of the bolt lying within the periphery of the ring when the parts are assembled and there being a diametrically arranged bore in the shaft having a portion adjacent the thicker part of the ring in which the body of the bolt is slidingly mounted with a portion of larger diameter extending from the first portion to the opposite side of the shaft, a spring arranged around the body of the bolt in said larger portion of the bore that presses against the shaft at one end and at the other end against the head of the bolt and tends to hold the thicker part of the ring in contact with the adjacent portion of the shaft, and regulating mechanism operated by the movement of the ring when the speed of rotation of the shaft exceeds a predetermined limit.

7. In a governing mechanism, the combination of a prime mover, a rotating shaft driven thereby, an eccentric ring surrounding the shaft and mounted on said shaft for movement transversely thereof, a spring that opposes said movement, a second shaft mounted adjacent the ring with its axis at right angles to the axis of the first shaft, a spring that tends to move the second shaft longitudinally, a trigger which holds the second shaft against movement by said spring and is adapted to be released by said ring when the speed of rotation of the first shaft exceeds a predetermined limit, a device for controlling the supply of motive energy to the prime mover, and means connecting the second shaft with said device, said means including a lever pivoted on the frame of the prime mover adjacent one end of said shaft, fixed and yielding abutments on the shaft which receive one end of the lever between them, the yielding abutment permitting the lever to be moved relative to the shaft to manually actuate said device, and a link connecting the other end of the lever to said device.

8. In a governing mechanism, the combination of a rotating shaft, a ring surrounding the shaft and having its mass unequally distributed about the axis of said shaft, a pin or bolt mounted in the shaft for sliding movement diametrically thereof and connected to said ring, a spring arranged around the pin adjacent the center of the shaft which opposes the movement of said pin and ring, and regulating mechanism that is brought into action by the ring when the speed of the shaft exceeds a predetermined limit.

In witness whereof, I have hereunto set my hand this twenty-eighth day of September, 1909.

FREDERICK SAMUELSON.

Witnesses:
   CHARLES H. FULLER,
   J. A. FOSTER.